United States Patent Office 2,731,024
Patented Jan. 17, 1956

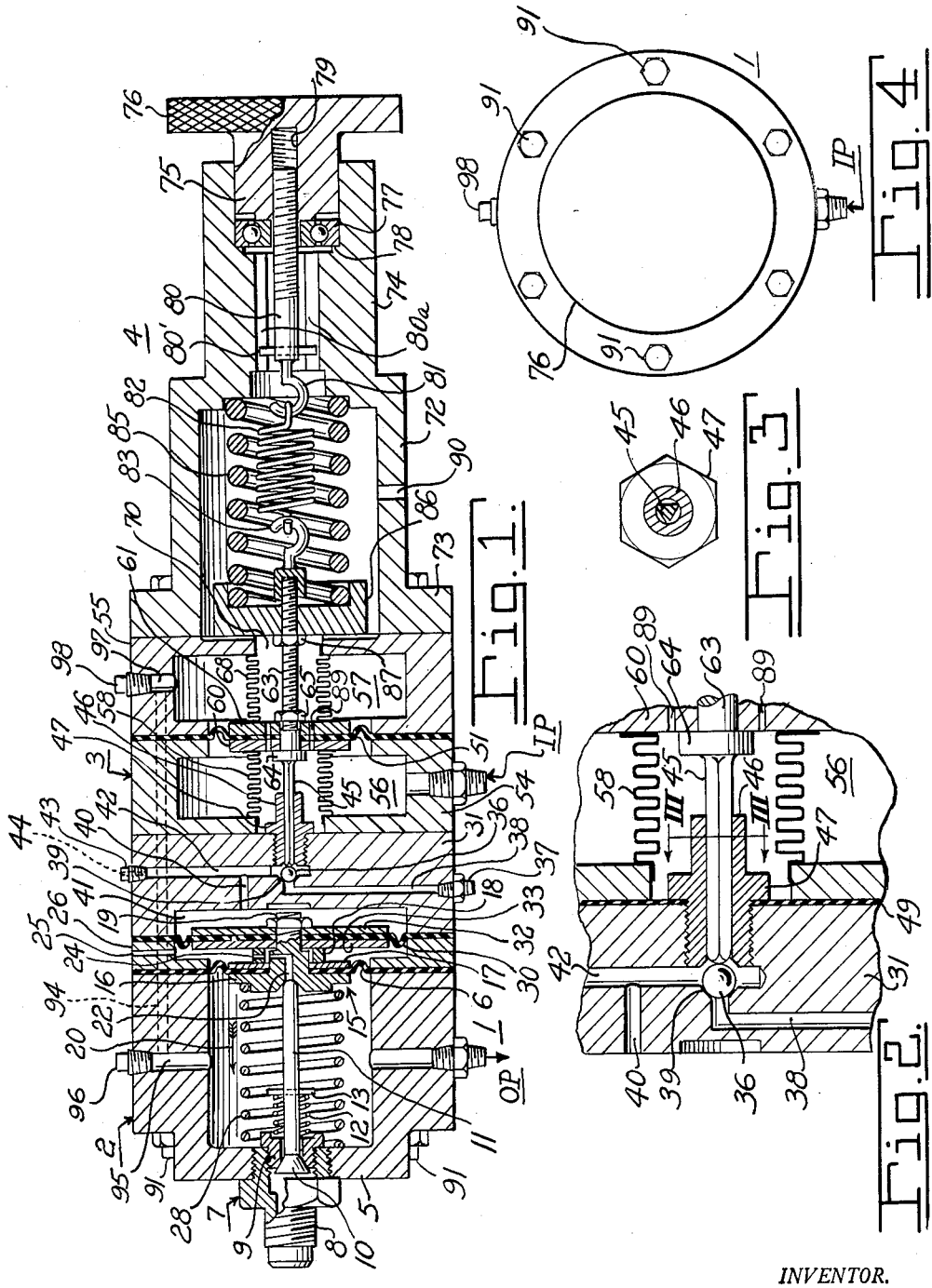

2,731,024

PNEUMATIC RELAYS EMBODYING A SIGNAL INPUT PRESSURE RESPONSIVE PILOT VALVE AND A BOOSTER PILOT VALVE

Ray S. Williams, Orrville, Ohio, assignor to Hagan Corporation, Pittsburgh, Pa., a corporation of Pennsylvania Application July 30, 1953, Serial No. 371,275

2 Claims. (Cl. 137—84)

This invention relates to pneumatic relays of the type which responds to an input and transmits an output that is proportional to the input, and more particularly to a relay provided with a booster valve and diaphragm therefor, which controls the relay output.

An object of this invention is to provide a pneumatic relay of the type which receives a variable input pressure, develops a corresponding pneumatic pressure output, and more particularly to provide such a relay with a booster pilot and diaphragm which will increase the response of the output of the relay to such input.

Another object of the invention is to provide a pneumatic relay having a diaphragm that is responsive to the output pressure, an auxiliary-controlled pilot valve for supplying an operating force to the diaphragm of the output valve, and a diaphragm for balancing the force of the output pressure on the output pressure-responsive diaphragm.

A still further object of the invention is to provide a relay of the type set forth in the preceding object, that may be adjusted to provide a relatively wide range of ratios of input to output pressures.

The above and other objects of the invention will be apparent to those of ordinary skill in the art to which the invention pertains, from the following description taken in conjunction with the accompanying drawing.

In the drawing:

Figure 1 is a view in longitudinal section of a pneumatic relay arranged and constructed in accordance with an embodiment of the invention;

Fig. 2 is an enlarged view in section of a booster pilot valve, which gives boosting action and quick input response to the relay;

Fig. 3 is a view in section taken on line III—III of Fig. 2; and

Fig. 4 is an end view of the relay as seen looking from right to left in Fig. 1.

In the drawing is illustrated a relay 1, arranged and constructed in accordance with what now appears to be a preferred form of the invention. The relay comprises a sending pilot valve or main pilot valve assembly 2, a booster pilot valve assembly 3, and an adjusting mechanism 4, assembled in tandem.

The main pilot valve assembly 2 comprises a body 5, which is closed at its outer end and open at its inner end. The open inner end has a diaphragm 6 extending across the same. Body 5 is provided with a pilot valve 7 that includes a fitting 8 that is screwed into the outer end of the body 5, at about its center, and to which a supply pipe (not shown) may be connected for supplying air pressure at substantially constant value. The inner end of the fitting 8 is provided with a valve seat member 9, which is arranged to be opened or closed by a valve 10 at the outer end of a valve stem 11. The valve stem 11 is urged in a direction to seat valve 10 on the valve seat 9, by a light compression spring 12. Spring 12, as shown, is retained between the inner end of the valve seat member 9 and a pin 13 extending through the stem 11.

Diaphragm 6 is provided with an exhaust valve member 15, having a flanged head 16 that bears on the pressure chamber side of diaphragm 6 at the central portion thereof, a backing plate 17 that bears on the outer face of diaphragm 6, a ported spacer ring 18, and a threaded shank 19. The central portion of the diaphragm 6 is clamped in pressure-tight relationship between the flanged head 16 and the backing plate 17. When diaphragm 6 is deflected in the direction of arrow 20, the exhaust port in valve member 15 is closed by the rounded inner end of valve stem 11. The exhaust port communicates with the atmosphere through a passageway 22 in the center of the valve head 16, and ports 24 in the ring 18, that lead to the atmosphere through a port 25 in a spacer ring 26. When valve stem 11 moves in the direction of arrow 20, the inlet port is uncovered and air pressure is admitted from the supply pipe through fitting 7 to the interior of housing 5. That pressure acts on diaphragm 6 and causes it to move in the direction opposite to that of arrow 20, until the valve 10 is seated on the inlet port seat. When that occurs, both the inlet and exhaust ports are closed.

A relatively strong compression spring 28 is located in housing 5 and normally urges the diaphragm 6 in a direction to unseat the exhaust port seat from the inner end of the valve stem 11.

Valve stem 11 is actuated to seat or unseat valve 10 from the valve seat 9 by a booster diaphragm 30. The marginal edge of the booster diaphragm 30 is clamped between spacer ring 26 and a plate 31. The central portion of diaphragm 30 is clamped between backing plates 32 and 33, by means of a nut 34 that is threaded on the shank 19. The threaded nut 34 and the shank 19, therefore, clamp the central portions of diaphragms 6 and 30 in operative relationship, as shown.

Plate 31 is provided with a valve 36, that controls the admission of operating pressure to diaphragm 30. A source of supply of air pressure under constant pressure, is supplied to diaphragm 30 through a fitting 37, a passageway 38, a valve port 39 controlled by valve 36, and a passageway 40 leading to a chamber 41 on the right-hand face of diaphragm 30. Port 40 also communicates to the atmosphere through a passageway 42 and a plug 43 having an orifice 44 therein.

The pressure established in chamber 41 for diaphragm 30 is proportional to the rate of leak-off through orifice 44 and the amount that valve 36 is open at any given instant. Valve 36, as shown, is a ball or sphere that is actuated by a valve stem 45 extending through the bore of a threaded tubular member 46, having a flange 47 thereon. The tubular member 46 is threaded into the plate 31. Between the flange 47 and the plate 31 is a sealing gasket 49. As shown in Figs. 2 and 3, stem 45 is triangular in shape, thereby providing three passageways between the sides of the stem and the bore of tubular member 46.

Valve stem 45 and the ball valve 36 are actuated by an input diaphragm 51, the marginal edge of which is clamped between a plate 54 and a plate 55. As shown, plates 54 and 55 are provided with chambers 56 and 57, respectively. The space surrounding the valve stem 45 in chamber 56 is sealed by means of a flexible seal 58, in the form of a bellows. One end of the bellows is soldered or braised to the edge of the aperture through which the tubular member 46 of the booster valve extends. The other end of the bellows is soldered or braised to a clamp disk 60 on the face of diaphragm 51 exposed to chamber 56. The opposite side of diaphragm 51 is provided with a clamp disk 61. The central portion of diaphragm 51 is clamped between disks 60 and 61, by the clamping pressure applied by a threaded rod 63, a flange 64, and a nut 65. The flange 64 and threaded rod 63 are preferably integral with the valve stem 45.

The space surrounding the threaded rod 63 is sealed off from chamber 57 by means of a yieldable seal 68 similar to seal 58. One end of seal 68 is welded or braised to disk 61, and the opposite end is welded or braised to the marginal edge of an aperture 70 in the right-hand end wall of plate 55.

The ratio-adjusting device 4 is attached to the right-hand face of plate 55, and comprises a housing member 72, having a flange 73 that abuts the adjacent face of plate 55. Housing 72 has a neck 74 for accommodating the stem 75 of a hand wheel 76. An anti-friction bearing 77 is mounted between the inner end of the stem 75 and a shoulder 78 in the neck 74. The stem 75 is provided with an internally threaded bore 79, into which a rod 80 is threaded. To prevent turning of rod 80 when stem 75 is turned, a pin 80' that passes through the rod, is provided. The pin runs in grooves 80a in neck 74.

One end of rod 80 is provided with a hook 81, to which is attached a tension spring 82. The other end of the tension spring is attached to a hook 83, which is secured to the right-hand end of rod 63. Within housing 72 is a relatively strong compression spring 85, one end of which abuts the inner end of stem 74, and the opopsite end of which is nested in a flanged bearing plate 86. Flange plate 86 is threaded on the outer end of threaded rod 63, and is locked in the proper position by means of a lock nut 87.

The compression spring 85 urges diaphragm 51 to the left, and ball valve 36 towards closed position. When the ball valve 36 is seated on the inlet port seat, chamber 41 of booster diaphragm 30 is connected to the atmosphere through passageway 40, the spaces between the sides of stem 45 and the bore of member 46, passageways 89 in plates 60 and 61, the spaces within seals 58 and 68, the space between plate 55 and the bearing member 86, and a port 90 leading from the interior of housing 72 to the atmosphere.

As shown in Fig. 1, the body 5, spacer ring 26, plates 31, 54, 55 and housing 72, are secured rigidly together by means of through bolts 91 spaced about the periphery of the ends of the relay, as shown in Fig. 4.

As shown in Fig. 1, chambers 57 and the chamber of body 5 are connected by a passageway 94, that is drilled through one edge of body 5, spacer ring 26, plates 31, 54 and 55. As shown, passageway 94 communicates with a side passage 95 in body 5, the outer end of which is closed by a screw plug 96, and the other end of passageway 94 communicates with chamber 57 through a side passage 97, the outer end of which is closed by a screw plug 98. By connecting the pressure chamber of housing 5 with chamber 57, the force exerted by the sending pressure on diaphragm 6 will be balanced by the force of the pressure in chamber 57 on diaphragm 51, provided the effective areas of the diaphragms 6 and 51 presented to these pressures are equal. In the following discussion of the operation of relay 1, it is assumed that the effective areas of diaphragms 6 and 51, which are acted upon by the sending pressure, are equal.

*Operation of relay 1*

The operation of relay 1 may be conveniently described in terms of the following algebraic equations.

In the following equations, let

OP be the output pressure from housing 5,
A1, the area of diaphragm 6,
BP, the booster pressure on diaphragm 30,
A2, the area of diaphragm 30 = 2A1,
IP, the input pressure to chamber 56,
A3, the area of diaphragm 51,
OP, the pressure in chamber 57 and acting on diaphragm 51,
FS1, the force of spring 28,
FS2, the force of spring 85,
FS3, the force of spring 82.

The forces acting on diaphragms 6 and 30 are in balance when the sum of these forces is equal to zero.

$$\therefore OPA1 + FS1 - BPA2 = 0, \text{ but since } BPA2 = 2BPA1,$$

$$\text{then } OPA1 = 2BPA1 - FS1$$

$$\therefore OP = 2BP - \frac{FS1}{A1}$$

but $$\frac{FS1}{A1} = K1$$

$\therefore$ the output pressure $OP = 2BP - K1$.

The forces acting on diaphragm 51 are in balance when the sum of them is equal to zero.

$$\therefore IPA3 - OPA3 - FS2 + FS3 = 0$$

$$\therefore OPA3 = IPA3 - FS2 + FS3$$

$$\therefore OP = IP - \frac{FS2}{A3} + \frac{FS3}{A3}$$

but $$\frac{FS2}{A3} = K2 \text{ and } \frac{1}{A3} = K3$$

$$\therefore OP = IP - K2 + K3FS3$$

As given above, the forces acting on diaphragms 6 and 30 are in balance when $OP = 2BP - K1$, and the forces acting on diaphragm 51 are in balance when $$OP = IP - K2 + K3FS3$$

$\therefore$ equating the two values of OP, $$2BP - K1 = IP - K2 + K3FS3$$

$\therefore$ the input pressure $IP = 2BP - K1 + K2 - K3FS3$.

From the above equations, it can be seen that the device or relay 1, by reason of the booster pilot valve 3, can be made quickly responsive to the input pressure by converting that input pressure to a boosting pressure, which acts on diaphragm 30 to operate the pilot valve stem 11 and its valve 10. The relay, therefore, responds quickly and causes an output pressure to be transmitted from the pilot valve mechanism 2. That pressure will be brought to a value which affects the input pressure IP quickly, by causing the controlled element to respond to the output pressure OP and restore the condition which brought about the change in the input pressure IP to chamber 56.

By adjusting the tension of spring 82, the value of K3 FS3 is changed, whereby the value of "OP" is changed.

Having thus described the invention, it will be apparent to those of ordinary skill in the art to which it pertains, that various modifications and changes may be made in the illustrated embodiment without departing from either the spirit or the scope thereof.

Therefore, what is claimed as new and desired to be secured by Letters Patent is:

1. A booster pilot valve sending relay comprising a body having therein a tandem assembly of a signal input pressure responsive pilot valve mechanism and a booster pilot valve pressure mechanism adapted to transmit a sending pressure; said signal input pressure responsive pilot valve mechanism comprising a diaphragm in the body providing a chamber therein on each side thereof, one of said chambers receiving a variable signal input pressure and the other the sending pressure of the booster pilot valve mechanism, a valve operatively connected to and actuated by said signal input pressure responsive diaphragm for establishing a variable output pressure that is linearly proportional to the signal input pressure; said booster pilot valve mechanism comprising a pair of spaced diaphragms having their central portions secured together, said pair of diaphragms forming in said housing on one side of the diaphragms a booster pressure sending chamber and on the other side a chamber for receiving the variable pressure from said signal input pressure pilot valve, a booster pilot valve having an exhaust port seat in the central portion of said pair of diaphragms that communicates with the space between them an exhaust passage in the body connecting said space with the atmosphere, a valve stem in the body having one end controlling the exhaust port seat, a pressure supply fitting in said body in line with said stem and having an inlet port seat, said stem having a valve adapted to engage said seat, the inlet and exhaust port seats being closed when the forces of the sending pressure and the variable pilot pressure acting on said pair of diaphragms are in balance, said body having a passage connecting the sending pressure chamber of the booster pilot valve to the sending pressure receiving chamber of the signal responsive pilot valve assembly, whereby the output pressure of the booster pilot valve assembly is caused to be equal to the signal input pressure.

2. A relay as in claim 1 in which means are provided for applying an adjustable force to the signal pressure input diaphragm whereby the range of output pressure may be adjusted with respect to the range of signal input pressures.

References Cited in the file of this patent

UNITED STATES PATENTS

| | | |
|---|---|---|
| 2,441,405 | Fitch | May 11, 1948 |
| 2,481,395 | Carns | Sept. 6, 1949 |
| 2,517,051 | Swenson | Aug. 1, 1950 |
| 2,520,547 | Hughes | Aug. 29, 1950 |
| 2,638,911 | Griswold et al. | May 19, 1953 |